(12) United States Patent
Baw et al.

(10) Patent No.: US 9,247,036 B2
(45) Date of Patent: Jan. 26, 2016

(54) FASCIA ASSEMBLY FOR A PORTABLE ELECTRONIC DEVICE

(75) Inventors: Andy K. Baw, Wheeling, IL (US);
Adam K. Cybart, McHenry, IL (US);
David G. Fliszar, Gurnee, IL (US);
Daniel P. Groebe, Lake Zurich, IL (US);
Nicholas A. Jinkinson, Reading (GB);
Rick Latella, Woodstock, IL (US)

(73) Assignee: GOOGLE TECHNOLOGY HOLDINGS LLC, Moutain View, CA (US)

( * ) Notice: Subject to any disclaimer, the term of this patent is extended or adjusted under 35 U.S.C. 154(b) by 1398 days.

(21) Appl. No.: 11/427,444

(22) Filed: Jun. 29, 2006

(65) Prior Publication Data

US 2008/0004087 A1    Jan. 3, 2008

(51) Int. Cl.
*H04M 1/00* (2006.01)
*H04M 1/23* (2006.01)
*H04M 1/02* (2006.01)

(52) U.S. Cl.
CPC .............. *H04M 1/23* (2013.01); *H04M 1/026* (2013.01); *H04M 1/0277* (2013.01)

(58) Field of Classification Search
USPC ................... 455/575.1, 575.8, 90.3, 347;
379/433.01, 433.06, 433.07, 433.11
See application file for complete search history.

(56) References Cited

U.S. PATENT DOCUMENTS

| | | | | |
|---|---|---|---|---|
| 6,504,928 | B1 * | 1/2003 | Toyooka | 379/433.01 |
| 6,752,946 | B2 * | 6/2004 | Toyooka | 264/154 |
| 6,824,916 | B2 | 11/2004 | Vine | |
| 6,824,919 | B2 | 11/2004 | Law et al. | |
| 6,839,430 | B2 * | 1/2005 | Kwak | 379/433.01 |
| 7,236,588 | B2 * | 6/2007 | Gartrell | 379/433.01 |
| 2002/0094838 | A1 * | 7/2002 | Wang | 455/550 |
| 2003/0036362 | A1 | 2/2003 | Buesseler et al. | |
| 2004/0253998 | A1 * | 12/2004 | Dunleavy et al. | 455/575.1 |
| 2005/0130721 | A1 * | 6/2005 | Gartrell | 455/575.8 |
| 2007/0275751 | A1 * | 11/2007 | Yu et al. | 455/550.1 |

FOREIGN PATENT DOCUMENTS

| | | |
|---|---|---|
| CN | 101480022 A | 7/2009 |
| WO | 2008/002698 A2 | 1/2008 |

OTHER PUBLICATIONS

International Search Report and Written Opinion for PCT Application No. PCT/US2007/64891, mailed Feb. 8, 2008, 7 pages.
Office Action for CN Application No. 200780024323.2, mailed Jun. 24, 2011, 19 pages.
Office Action Response for CN Application No. 200780024323.2, filed Nov. 9, 2011, 10 pages.
Office Action for CN Application No. 200780024323.2, mailed Apr. 12, 2012, 20 pages.
Office Action Response for CN Application No. 200780024323.2, filed Jun. 27, 2012, 12 pages.
Office Action for CN Application No. 200780024323.2, mailed Nov. 28, 2012, 15 pages.
Motorola User Manual L7, Dec. 31, 2005, 4 pages.

* cited by examiner

*Primary Examiner* — Tuan A Tran (57) ABSTRACT

A fascia member (200) for an electronic device (700) includes a thin, flexible membrane (201) coupled to a rigid skeletal member (202). The thin, flexible membrane (201) includes a transparency region (203) and a deflectable key region (204). The thin, flexible membrane (201) may thus serve as a major front face for the electronic device (700) with no break lines between display and keypad. Printing on one side of the thin, flexible membrane (201) provides alphanumeric indicia (207) and graphical designs for the electronic device (700).

17 Claims, 7 Drawing Sheets

FASCIA ASSEMBLY FOR A PORTABLE ELECTRONIC DEVICE

BACKGROUND

1. Technical Field

This invention relates generally to a fascia for a portable electronic device, and more specifically to a fascia assembly having a thin, flexible membrane that serves both as a depressible keypad and as a display.

2. Background Art

Portable electronic devices, such as mobile telephones, portable music players, and portable gaming devices, are becoming more and more commonplace. While once a rare luxury, it is now not uncommon to see a person with two or three electronic devices operating simultaneously. For example, a businessperson commuting to work may have a mobile telephone for receiving calls, a portable music player for listening to music, and a wireless messaging device for sending e-mail and browsing the Internet. Advances in engineering and design have made these devices increasingly affordable.

In addition to reducing prices, advances in technology have also reduced the size of these devices. While a mobile telephone in the early 1980s came in a bag and was about the size of a shoe, today's mobile telephones easily slip into a shirt pocket. The devices are becoming more stylish as well. By way of example, the RAZR mobile telephone, manufactured by Motorola, Inc., has won critical acclaim for its sleek, ultra thin design. Consumers sometimes give as much weight to the aesthetic appearance of a device when making a purchase as they do to the device's feature set. As such, the trend for designers is to create smaller devices without compromising aesthetic appeal.

There are problems, however, in attempting to design new, smaller, more fashionable devices. One problem involves tooling limitations in the manufacture of exterior housing components of these devices. The most common way to manufacture durable housing components for rechargeable battery packs is by way of injection molding. In the injection molding process, molten plastic is injected into the cavity of a metal mold. The plastic flows throughout the cavity, thereby filling it. When the plastic cools, the mold is opened and the plastic part is removed.

The problem with this process is that there is a fundamental limit to the minimum thickness per unit area of the walls of any part. This is due to the flow of the molten plastic. If the cavity in the mold includes passages that are too thin, the plastic will not flow properly through these thin regions. Improper plastic flow leads to parts with walls that break easily or have holes in them. The net result is a battery housing with walls that fall apart too easily.

A second problem involves the user interface. Injection molded parts are generally manufactured from rigid materials such as polycarbonate and ABS resins. To incorporate a user interface, such as a keypad for example, the designer must add holes for keys and buttons. By adding these holes, the plastic remaining between the holes must be increased in thickness to provide the overall rigidity. This increased bulk can compromise the aesthetic appearance.

There is thus a need for an improved electronic device housing that offers a thinner, yet still reliable, housing component.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Figure 1:
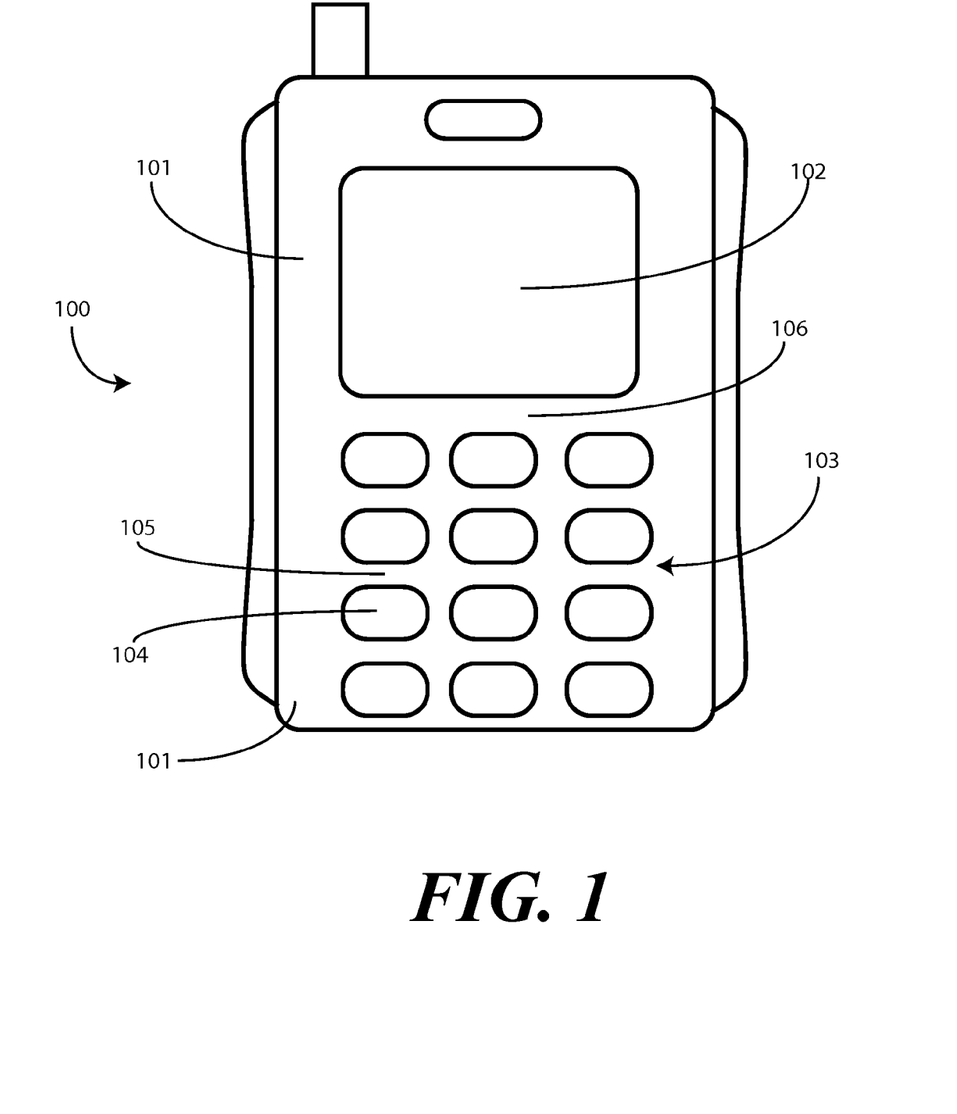
FIG. 1 illustrates a prior art electronic device.

Turning first to FIG. 1, illustrated therein is a prior art electronic device 100 having a prior art housing 101. The prior art housing 101, which is plastic made by way of injection molding, is a multi-part assembly. The prior art housing 101 has a display cover 102 attached thereto. The display cover 102, which is a separate piece of translucent plastic, is generally glued or snapped to the prior art housing 101. To accommodate snaps, the prior art housing 101 must generally be two to three millimeters thick at a minimum.

The prior art housing 101 also includes several keys 104. The keys 104 protrude through holes in the prior art housing 101. The keys 104 may be injection molded plastic components as well, which are mounted on spring-loaded switches within the device 100. To maintain sufficient rigidity, sections of plastic 105 between the keys 104 must be several millimeters in width and two to three millimeters thick. Additionally, the mechanical separation 106 between the display cover 102 and the keys 104 must be many millimeters wide. This mechanical separation 106 can be an unaesthetic feature on the electronic device.

The present invention solves both the problem of thickness limitations due to injection molding and the problem of aesthetic limitations due to the various mechanical separation sections that protrude from prior art electronic devices. In accordance with one embodiment of the present invention, a thin, flexible membrane, such as plastic film, is coupled to a skeletal housing member. A single, unitary piece of film, which can be extruded or otherwise manufactured at a thickness that is 50% or more thinner than by injection molding, serves as both a display and keypad in one exemplary embodiment. The single piece of film runs continuously from display to keypad, thereby eliminating any plastic mechanical separations protruding from the device. The result is a clean, sleek, smooth, thin, and elegant device housing.

Figure 2:
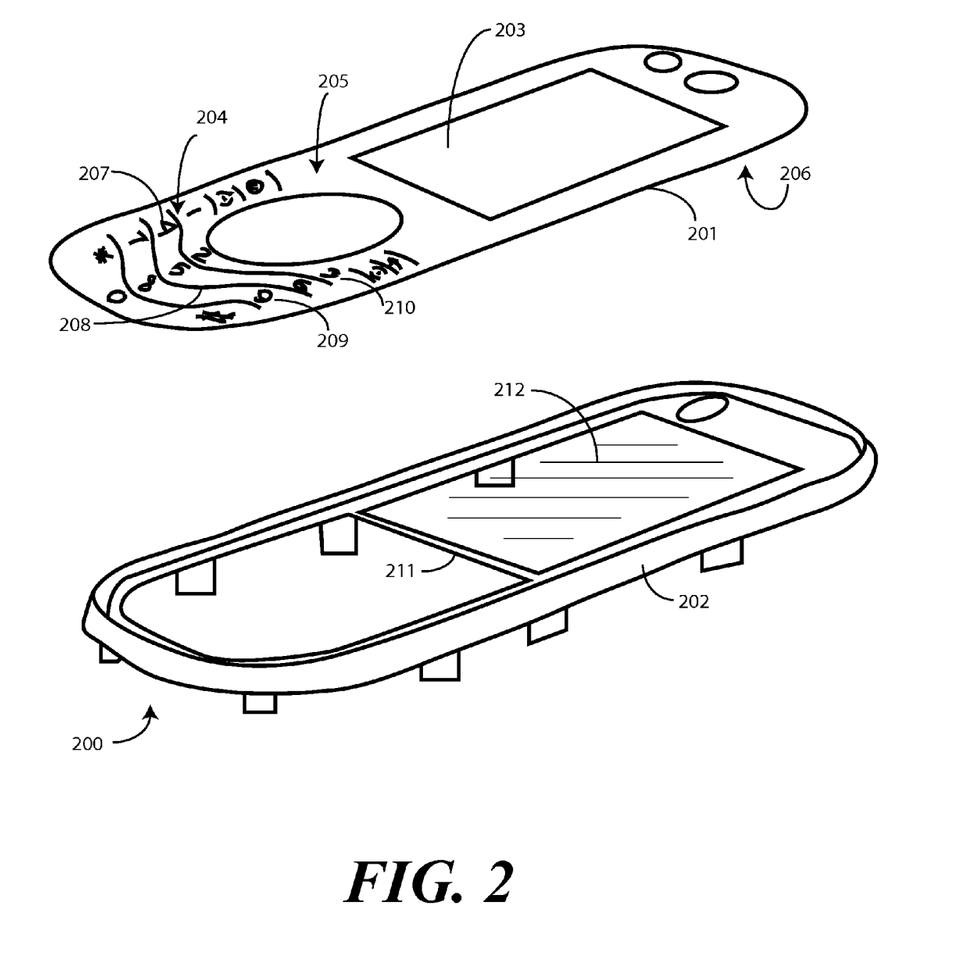
FIG. 2 illustrates an exploded view of one embodiment of a fascia in accordance with the invention.

Turning now to FIG. 2, illustrated therein is an exploded view of a unitary fascia member 200 in accordance with one embodiment of the invention. The fascia member 200 is suitable for use as a housing component for an electronic device. A "fascia" is a covering or housing, which may or may not be detachable, for an electronic device like a mobile telephone. While the drawings herein employ a mobile telephone as an exemplary electronic device for discussion, it will be clear to those of ordinary skill in the art having the benefit of this disclosure that the invention is not so limited. The fascia of the present invention could be used for any electronic device having a display, a keyboard, or both.

The fascia member 200 includes a thin, flexible membrane 201. In one embodiment, the thin, flexible membrane 201 is a translucent, plastic film, such as 0.4 millimeter clear polycarbonate film. The thin, flexible membrane 201 serves as a continuous fascia for an electronic device, and offers a fascia having a thickness of less than one millimeter. The thin, flexible membrane 201 includes both a transparency region 203 that serves as a display interface, and a deflectable key region 204 that functions as a plurality of deflectable keys 209,210.

The thin, flexible membrane 201 is coupled to a rigid skeletal support member 202. The rigid skeletal support member 202, in one embodiment, is manufactured with a rigid, durable plastic resin such as OQ1030, manufactured by General Electric. The rigid skeletal support member 202 is coupled to the thin, flexible membrane 201 about the perimeter of the thin, flexible membrane 201. While the thin, flexible membrane 201 may be coupled to the rigid skeletal support member 202 in any of a variety of ways, exemplary methods of coupling include insert molding, pressure sensitive adhesive, liquid adhesives, or ultrasonic welding.

Insert molding is well known in the art. Essentially, in an insert molding process, a solid member, such as the thin, flexible membrane 201 of FIG. 2, is inserted into a mold cavity prior to the injection of molten plastic. When the molten plastic is injected, for example to form the rigid skeletal support member 202, the plastic flows about the solid piece, thereby adhering to it. When the solid piece is also plastic, the solid piece melds with the molten plastic. The resultant part is a plastic part with clean lines having the solid member embedded therein. By way of example, U.S. Pat. No. 4,249,874, issued to Reichenbach et al., incorporated herein by reference, discloses one exemplary approach. In ultrasonic welding, the rigid skeletal support member 202 is first manufactured by a process like injection molding. The thin, flexible membrane 201 is then placed atop the rigid skeletal support member 202, and ultrasonic waves create frictional heat to bond the two components together.

In one embodiment, the rigid skeletal support member 202 is includes plastic only about the perimeter of the thin, flexible membrane 201. In such an embodiment, the thin, flexible membrane 201 is suspended across the rigid skeletal support member 202 like a drumhead. In this embodiment, there is no plastic behind either the transparency region or the deflectable key region.

In another embodiment, to provide additional structural support to the thin, flexible membrane 201, the rigid skeletal support member 202 includes a cross beam 211 running along the rear face 206 of the thin, flexible membrane 201 between the transparency region 203 and the deflectable key region 204. By running along the rear face 206, the front face 205 remains clean and smooth, with no mechanical separation components visible to a user between the transparency region 203 and the deflectable key region 204. There are no "break lines" visible to the user between the display and keypad.

In another embodiment, to provide protection to a display module, such as a liquid crystal display that may be in use in the electronic device, a planar section 212 of translucent plastic may span, across the rear face 206, the transparency region 203 of the thin flexible membrane 201. This planar section 212 offers both additional rigidity to the transparency region 203 of the thin, flexible membrane 201, as well as structural support to the rigid skeletal support member 202.

There is no plastic of the rigid skeletal support member 202, however, behind the deflectable key region 204 of the thin, flexible membrane 201. This absence of plastic allows depressible key sections, e.g. 209,210, to deflect, thereby serving as keys for the electronic device as will be described below.

Note that in one embodiment above, a translucent plastic film is used as the thin, flexible membrane 201. To provide ornamentation, text, graphics, and other visual indicators, the thin, flexible membrane 201, in one embodiment, includes printing disposed on the rear face 206. By printing on the rear face 206 of the thin, flexible membrane 201, the front face 205 remains smooth and glossy. Additionally, the printing, being disposed on the inside of the device, is protected from wear and abrasion. It will be clear to those of ordinary skill in the art having the benefit of this disclosure that the printing could equally be done on the front face 205. There may even be advantages in doing so, including offering unique textural effects on the exterior of the electronic device.

When printing on either face of the thin flexible membrane 201, there is no printing in the transparency region 203. The lack of printing allows the transparency region 203 to remain translucent, thereby providing a visual window to the electronic device display positioned beneath the transparency region 203.

In the printing process, various alphanumeric indicia 207 may be included. For example, where the fascia member 200 is to be used for a mobile telephone, the alphanumeric indicia 207 may include numbers and letters for a plurality of depressible keys 209,210. In such an embodiment, the alphanumeric indicia 207 may comprise graphics corresponding to a telephone keypad.

To provide additional flexibility to the deflectable key region 204, the thin, flexible membrane 201 may include at least one deflectable key region aperture 208 passing between a first depressible key 209 and a second depressible key 210. The deflectable key region aperture 208 allows, for example, first depressible key 209 to be actuated without disturbing second depressible key 210.

Figure 3:
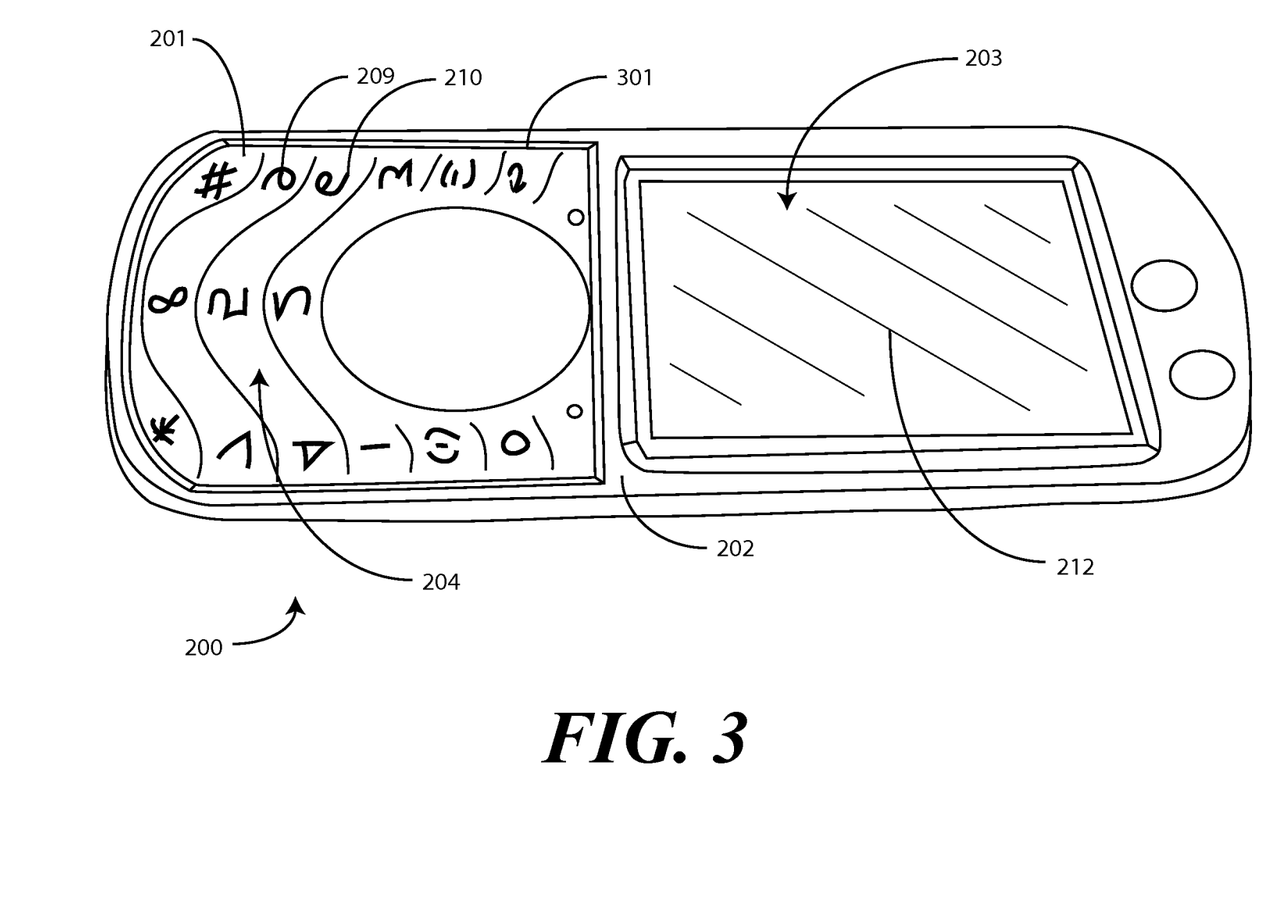
FIG. 3 illustrates a rear perspective view of one embodiment of a fascia in accordance with the invention.

Turning now to FIG. 3, illustrated therein is a rear, perspective view of an assembled, unitary fascia member 200 in accordance with one embodiment of the invention. From this view, the rear face 206, as well as the various components of the rigid skeletal support member 202 may be more clearly seen.

The rigid skeletal support member 202 is disposed along the rear face 206 of the thin, flexible membrane 201 in the embodiment of FIG. 3. So that the deflectable key region 204 continues to be deflectable, the rigid skeletal support member 202 is disposed about a perimeter 301 of the deflectable key region 204. Thus, as noted above, no material from the rigid skeletal support member 202 passes beneath the deflectable keys 209,210.

In the embodiment of FIG. 3, the planar section 212 has been employed to provide structural support to the transparency region 203. Thus, the planar section 212 spans, along the rear face 206, the transparency region of the thin, flexible membrane 201.

Further, in the embodiment of FIG. 3, the cross beam 211 has been included. The cross beam 211 runs across the rear face 206, between the transparency region 203 and the deflectable key region 204 of the thin, flexible membrane 201.

Figure 4:
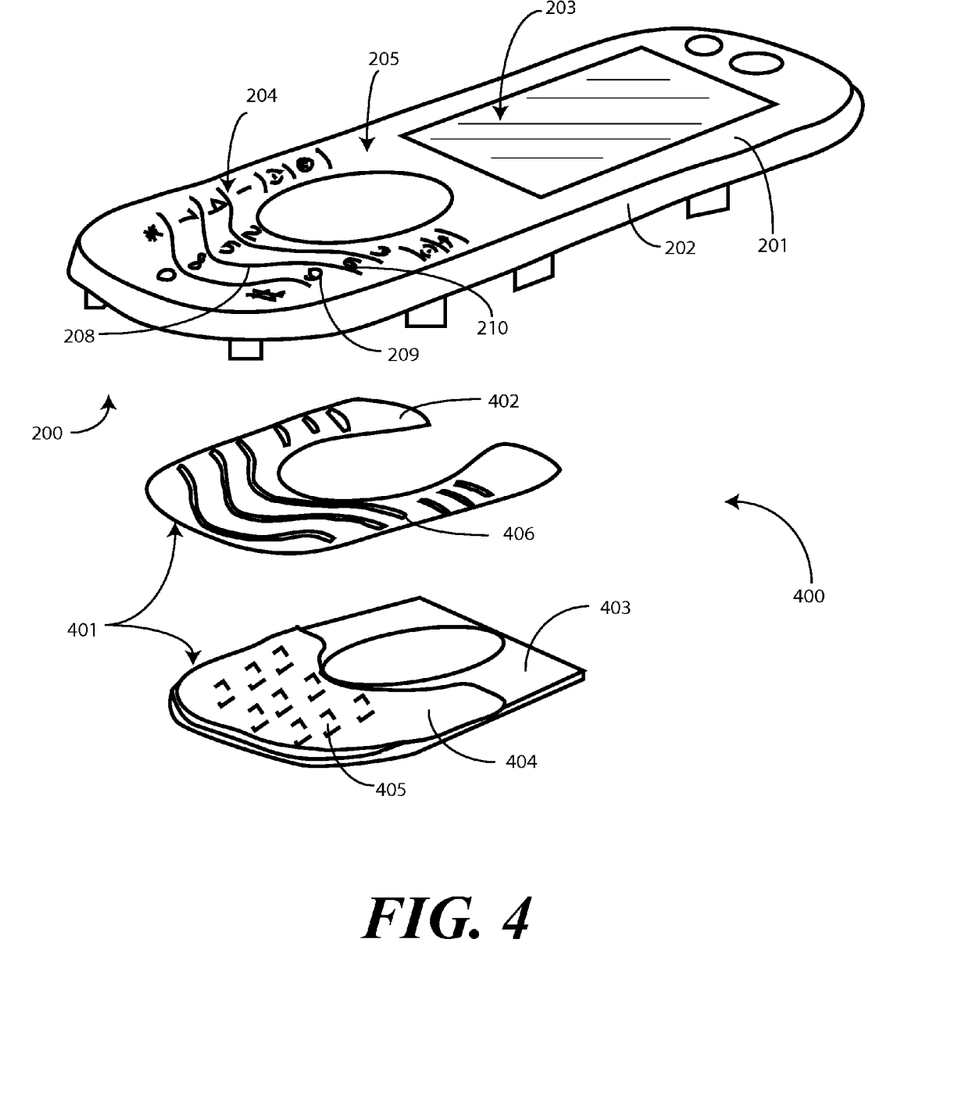
FIG. 4 illustrates an exploded view of a one embodiment of a housing assembly including a fascia in accordance with the invention.

Turning now to FIG. 4, illustrated therein is an exploded view of a fascia assembly 400 in accordance with one embodiment of the invention. The fascia assembly 400 includes a fascia member 200 with a keypad module 401 coupled thereto. The keypad module 401 may be coupled to the fascia member 200 prior to assembly of the electronic device, for example by using an adhesive between the fascia member 200 and the keypad module 401. Alternatively, the keypad module 401 may be coupled to the inner components of the electronic device, and then coupled to the fascia member 200 when the fascia member 200 is coupled to the overall electronic device.

The fascia member 200 includes a thin, flexible membrane 201, which may be a thin, plastic film, coupled to a rigid skeletal support member 202. As was shown in FIGS. 2 and 3, in one embodiment, the fascia member 200 includes at least a transparency region 203 and a deflectable key region 204 so that the fascia member 200 can serve as a unitary housing component with no break lines between display and keypad.

The keypad module 401, which may be adhered to the fascia member 200 by an adhesive, includes a printed circuit board 403 and a semi-rigid polymer layer 404. The printed circuit board 403 includes a plurality of switches 405 that serve as an electro-mechanical interface between the depressible keys 209,210 and the electronic circuitry disposed on the printed circuit board 403. The semi-rigid polymer layer 404, which may be a silicone gel layer, provides both mechanical support to the deflectable key region 204 and a gentle tactile feel to the user when actuating the depressible keys 209,210.

A pliable guidance layer 402 may be included between the printed circuit board 403 and the fascia member 200. Where the semi-rigid polymer layer 404 is employed, the pliable guidance layer 402 may be disposed between the fascia member 200 and the semi-rigid polymer layer. The pliable guidance layer 402, which may be manufactured from a spongy rubber material like silicone, can include tactile ribs 406. The tactile ribs 406, in one embodiment, align with the deflectable key region apertures 208 such that the tactile ribs 406 protrude through the deflectable key region apertures 208. The result is a guiding, tactile, outline indicator of each depressible key 209,210 on the front surface of the electronic device. Such a protruding tactile rib 406 is shown in the fascia assembly 400 of FIG. 5.

Figure 5:
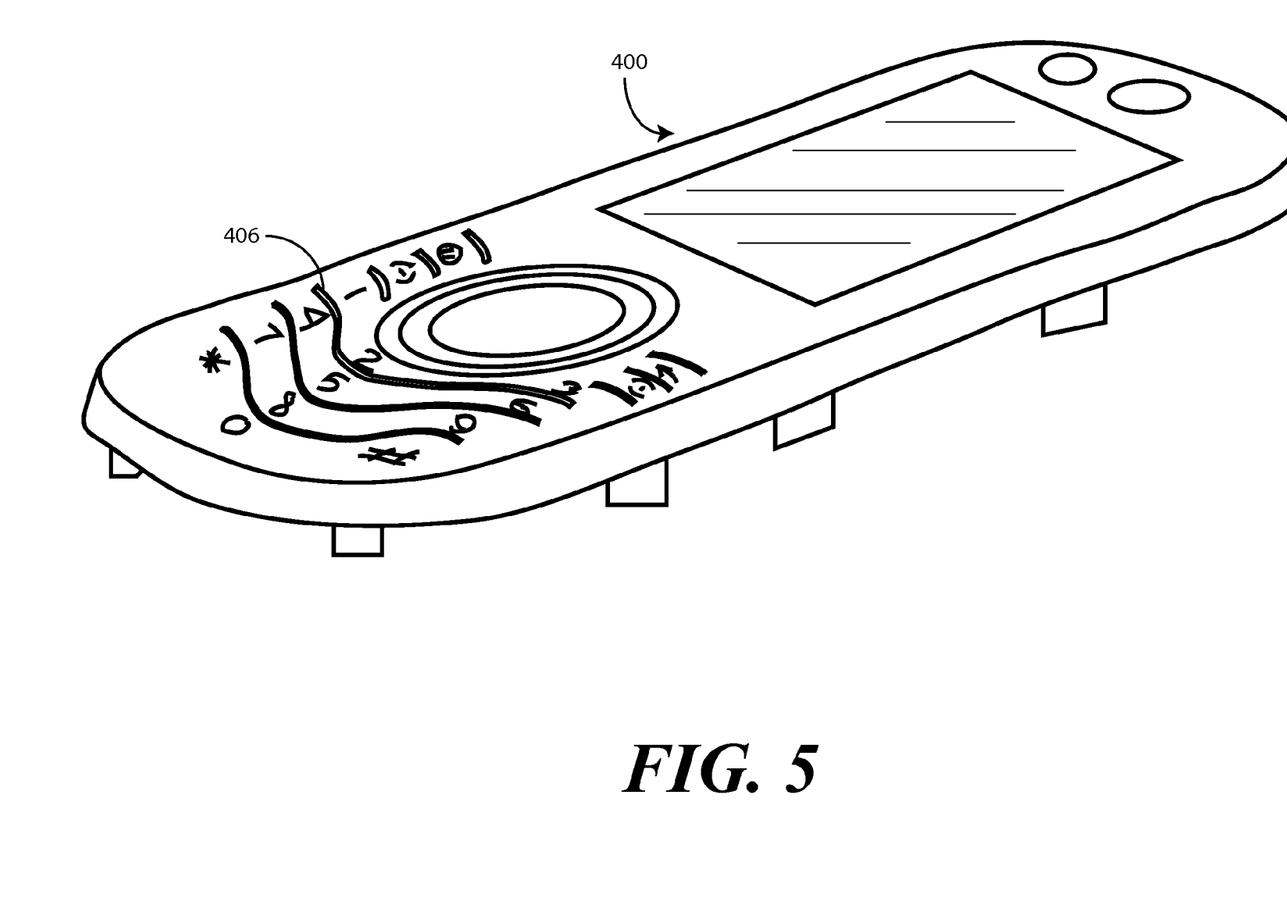
FIG. 5 illustrates a perspective view of one embodiment of a housing in accordance with the invention.
Figure 6:
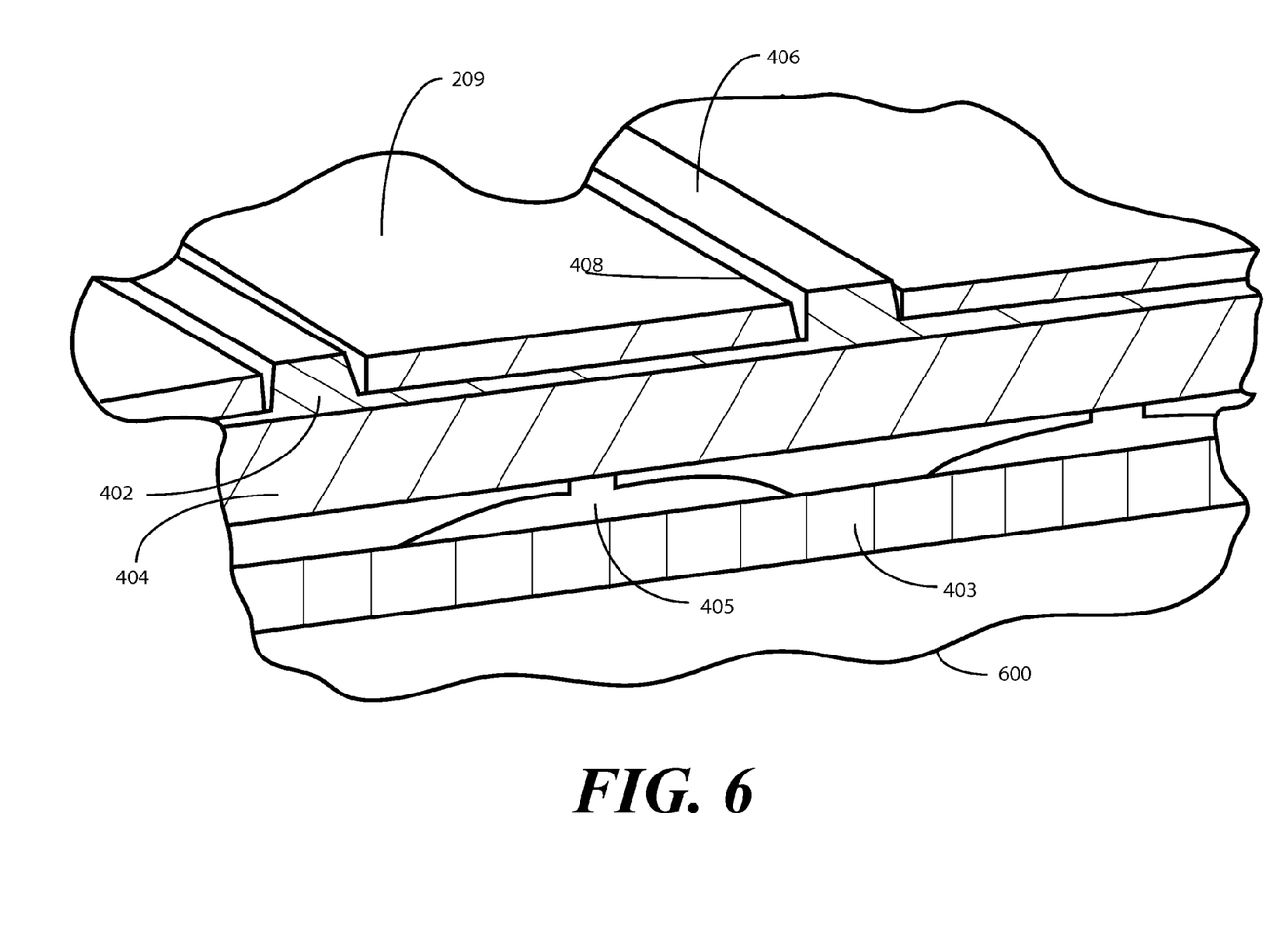
FIG. 6 illustrates a magnified view of one embodiment of a housing in accordance with the invention.

Turning now to FIG. 6, illustrated therein is a cross sectional view of the completed, unitary fascia assembly 400 of FIGS. 4 and 5. The enlarged cross section 600 shows the layering of the printed circuit board 403, the semi-rigid polymer layer 404, and the pliable guidance layer 402.

Switches 405 are disposed on the printed circuit board. Atop the switches 405 sits the semi-rigid polymer layer 404. Where the switches 405 are illuminated, a clear, semi-rigid polymer layer 404 may be used as a light pipe or light guide between the switch 405 and the depressible key 209.

The pliable guidance layer 402 sits atop the semi-rigid polymer layer 404, such that the tactile rib 406 passes through the deflectable key region aperture 408. Thus, the tactile rib 406 offers a user a convenient, touch perceptible way to guide his fingers to the depressible keys 209. The various layers may be coupled together by way of a glue or double-sided adhesive film.

Figure 7:
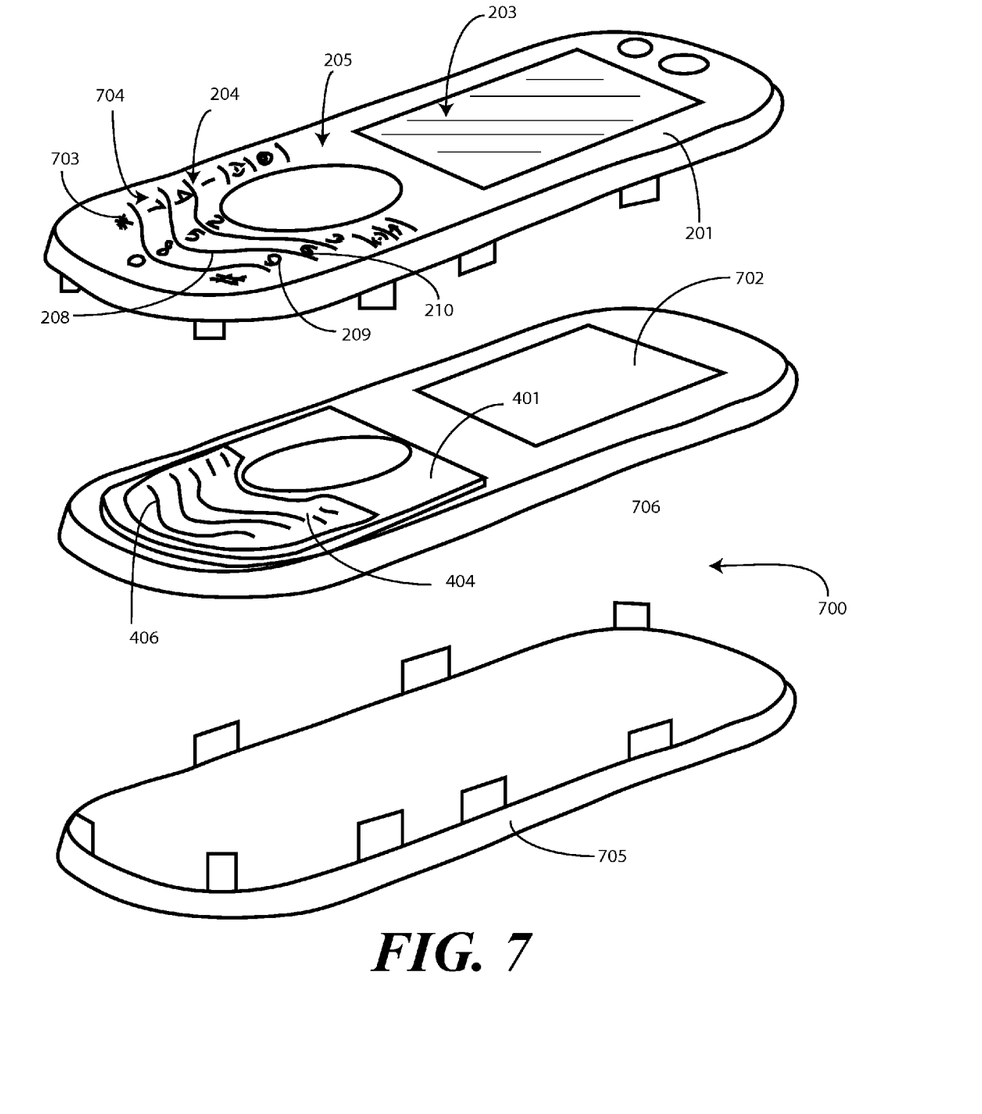
FIG. 7 illustrates an exploded view of one embodiment of an electronic device having a housing with a fascia in accordance with the invention.

Turning now to FIG. 7, illustrated therein is an exploded view of a wireless telecommunication device 700 using a fascia assembly 701 in accordance with one embodiment of the invention. The front face 205 of the fascia assembly 701 serves as the major front face for the wireless telecommunication device 700. The fascia assembly 701 additionally serves as an upper housing for the wireless telecommunication device.

As with previous embodiments, the fascia assembly 701 includes a thin, flexible membrane 201 spanning substantially the major front face of the wireless telecommunication device 700. The thin, flexible membrane 201 includes a transparency region 203 and a deflectable key region 204. The deflectable key region 204 serves as a plurality of depressible keys 209, 210. There are no external break lines between the transparency region 203 and the deflectable key region 204.

Electronic circuitry 706, which may include a transceiver, processor, memory, clock and driver circuits, power management circuitry and other functional circuitry, is disposed within the wireless telecommunication device 700. The electronic circuitry 706 includes a display module 702. The display module, which may be a liquid crystal or similar type of display, is disposed within the wireless telecommunication device 700 so as to be viewable through the transparency region 203 of the fascia assembly 701.

A keypad module 401, such as the one shown in FIG. 4 having a plurality of switches, is also included. The keypad module 401 is disposed within the wireless telecommunication device 700 so as to be actuatable upon any of the plurality of keys 209,210 being pressed by a user.

In the exemplary embodiment of FIG. 7, the wireless telecommunication device 700 is illustrated as a mobile radiotelephone. It will be clear to those of ordinary skill in the art having the benefit of this disclosure, however, that the invention is not so limited. Other electronic devices, including portable music players, portable computers, electronic messaging devices, pagers, gaming devices, and two-way radios may also employ the fascia assembly 701 of the present invention.

In the exemplary embodiment of FIG. 7, the plurality of depressible keys 209,210 serve as the mobile radiotelephone keypad interface 704. The user simply presses any of the keys 209,210 to operate the device. As noted in FIG. 2, the thin, flexible membrane 201 may include graphical printing 703, such as the numbers 0, 1, 2, 3, 4, 5, 6, 7, 8, and 9, and the letters abc, def, ghi, jkl, mno, pqrs, tuv, and wxyz. Additionally, where the pliable guidance layer 404 is used, the tactile ribs 406 may protrude through the deflectable key region apertures 208 to provide key guidance to the user. The wireless telecommunication device 700 is assembled by coupling the fascia assembly 701 to a bottom housing member 705 about the electronic circuitry 706.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A faceplate tier an electronic device, the faceplate comprising a unitary fascia member comprising a thin, flexible membrane, the unitary fascia member having at least a transparency region and a deflectable key region, the deflectable key region functioning as a surface for a plurality of depressible keys and having at least one deflectable key region aperture passing between a first depressible key and a second depressible key.

2. The faceplate of claim 1, further comprising a rigid skeletal support member coupled to the unitary fascia member.

3. The faceplate of claim 2, wherein the unitary fascia member comprises a front face and a rear face, wherein the rigid skeletal support member is disposed along the rear face.

4. The faceplate of claim 3, wherein the rigid skeletal support member is disposed about a perimeter of the deflectable key region.

5. The faceplate of claim 3, wherein the rigid skeletal support member comprises translucent plastic, further wherein the rigid skeletal support member comprises a planar section spanning, along the rear face, the transparency region of the unitary fascia member.

6. The faceplate of claim 3, wherein the rigid skeletal support member comprises a cross beam running across the rear face of the unitary fascia member between the transparency region and the deflectable key region.

7. The faceplate of claim 3, wherein the unitary fascia member has printing disposed thereupon, the printing comprising alphanumeric indicia for the plurality of depressible keys.

8. The faceplate of claim 7, wherein the alphanumeric indicia comprise telephone keypad graphics.

9. The faceplate of claim 2, wherein the unitary fascia member is coupled to the rigid skeletal support member by one of insert molding, pressure sensitive adhesive, liquid adhesive, or ultrasonic welding.

10. The faceplate of claim 1, wherein the thin, flexible membrane comprises a plastic film having a thickness of less than 1 mm.

11. A fascia assembly fir a portable electronic device, the fascia assembly comprising:
  a fascia, comprising:
    a unitary fascia member comprising a flexible film, the unitary fascia member having at least a transparency region and a deflectable key region, the deflectable key region functioning as a plurality of depressible keys; and
    a rigid skeletal support member coupled to the unitary fascia member; and
  a keypad module adhered to the fascia, the keypad module comprising:
    a printed circuit board having a plurality of switches disposed thereon; and
    a semi-rigid polymer layer disposed between the fascia and the printed circuit board;
  wherein the rigid skeletal support member comprises plastic, further wherein the rigid skeletal support member is coupled to the fascia assembly by insert molding,
  wherein the plurality of switches are aligned with the plurality of depressible keys, such that when the fascia is pressed at a location corresponding to one of the plurality of depressible keys, a corresponding one of the plurality of switches is actuated, and
  wherein the unitary fascia member comprises at least one deflectable key region aperture passing between a first depressible key and a second depressible key, further comprising a pliable guidance layer comprising at least one tactile rib, the pliable guidance layer being disposed between the semi-rigid polymer layer and the unitary fascia member such that the at least one tactile rib protrudes through the at least one deflectable key region aperture.

12. The fascia assembly of claim 11, wherein the semi-rigid polymer layer comprises translucent silicone.

13. The fascia assembly of claim 11 wherein the rigid skeletal support member comprises plastic, further wherein the rigid skeletal support member is coupled to the fascia assembly by one of ultrasonic welding, pressure sensitive adhesive, liquid adhesive, or insert molding.

14. A wireless telecommunication device having a major front face, the wireless telecommunication device comprising:
  a fascia assembly comprising a thin, flexible membrane spanning substantially the major front face, the thin, flexible membrane having at least a transparency region and a deflectable key region, the deflectable key region functioning as
  a plurality of depressible keys, wherein the thin, flexible membrane comprises at least one key region aperture;
  a display module disposed within the wireless telecommunication device so as to be viewable through the transparency region of the fascia assembly; and
  a keypad module comprising a plurality of switches disposed within the wireless telecommunication device so as to be actuatable upon any of the plurality of depressible keys being pressed.

15. The wireless telecommunication device of claim 14, wherein the wireless telecommunication device comprises a mobile radiotelephone, further wherein the plurality of depressible keys comprise a mobile radiotelephone keypad interface.

16. The wireless telecommunication device of claim 14, wherein the thin, flexible membrane functions as a keypad actuation surface, the thin, flexible membrane comprising keypad graphics printing disposed along a rear face of the thin, flexible membrane.

17. The wireless telecommunication device of claim 16, wherein the at least one key region aperture comprises a plurality of key region apertures, further comprising a guidance layer coupled to the thin, flexible membrane, the guidance layer comprising a plurality of tactile ribs, wherein the plurality of tactile ribs protrude through the plurality of key region apertures.

* * * * *

UNITED STATES PATENT AND TRADEMARK OFFICE
CERTIFICATE OF CORRECTION

| | | |
|---|---|---|
| PATENT NO. | : 9,247,036 B2 | Page 1 of 1 |
| APPLICATION NO. | : 11/427444 | |
| DATED | : January 26, 2016 | |
| INVENTOR(S) | : Andy K. Baw et al. | |

It is certified that error appears in the above-identified patent and that said Letters Patent is hereby corrected as shown below:

On the title page item (73), in column 1, in "Assignee", line 2, delete "Moutain View," and insert
-- Mountain View, --, therefor.

In the claims,

In column 7, line 2, in claim 1, delete "tier" and insert -- for --, therefor.

In column 7, line 41, in claim 11, delete "fir" and insert -- for --, therefor.

Signed and Sealed this
Third Day of May, 2016

Michelle K. Lee
*Director of the United States Patent and Trademark Office*